United States Patent
Vaughn

(10) Patent No.: US 7,646,868 B2
(45) Date of Patent: Jan. 12, 2010

(54) METHOD FOR STEGANOGRAPHIC CRYPTOGRAPHY

(75) Inventor: Robert Vaughn, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 11/512,798

(22) Filed: Aug. 29, 2006

(65) Prior Publication Data

US 2008/0069340 A1 Mar. 20, 2008

(51) Int. Cl.
H04L 9/28 (2006.01)
(52) U.S. Cl. .......................................... 380/28; 380/56
(58) Field of Classification Search .................... 380/28, 380/56
See application file for complete search history.

(56) References Cited

U.S. PATENT DOCUMENTS

| 5,613,004 | A * | 3/1997 | Cooperman et al. ............ 380/28 |
| 7,167,825 | B1 * | 1/2007 | Potter ............................. 704/9 |
| 7,508,935 | B2 * | 3/2009 | Oommen et al. .............. 380/28 |
| 2001/0012361 | A1 * | 8/2001 | Kasahara ...................... 380/30 |
| 2002/0035619 | A1 * | 3/2002 | Dougherty et al. .......... 709/219 |
| 2004/0006455 | A1 * | 1/2004 | Fux et al. ....................... 704/4 |
| 2004/0054677 | A1 * | 3/2004 | Mueller et al. .............. 707/100 |
| 2007/0086587 | A1 * | 4/2007 | Farahat et al. ................. 380/28 |

OTHER PUBLICATIONS

Wayner, Peter, "Disappearing Cryptography" Apr. 1996, pp. 93-123 "Using Grammar for Mimicry".*
Mark Chapman et al.; A Practical and Effective Approach to Large-Scale Automated Linguistic Steganography; Omni Tech Corporation; pp. 11.
Mark Chapman; NICETEXT System; NICETEXT System Official Home Page; University of Wisconsin, Milwaukee.; http://www.nicetext.com; date last vistited Aug. 29, 2006.
Wayner P, "Disappearing Cryptography" Disappearing Cryptography: Being and Nothingness on the net, Apr. 1996, XP002144813, pp. 93-123.
International Search Report for EP Patent Application No. 07253377. 1, Mailed on Dec. 27, 2007, 5 Pages.

* cited by examiner

Primary Examiner—Gilberto Barron, Jr.
Assistant Examiner—David Le
(74) Attorney, Agent, or Firm—D'Ann Naylor Rifai

(57) ABSTRACT

Methods for encrypting a clear text message into hidden cipher text are disclosed. Embodiments of the present invention may be used to encrypt clear text into a contextual altered form that does not appear to an observer to be cipher text. Embodiments of the present invention produce encrypted text without using a mathematical model of prime number factorization. Embodiments of the present invention provide better security by producing better quality cipher text output than known linguistic steganography approaches.

28 Claims, 13 Drawing Sheets

| PARSED KEY PHRASE | INDEX VALUE | LENGTH | CONCATENATED LENGTH TO INDEX VALUE |
|---|---|---|---|
| THE | 191750 | 6 | 6191750 |
| GREEN | 100443 | 6 | 6100443 |
| MOUNTAIN | 129169 | 6 | 6129169 |
| HAS | 103258 | 6 | 6103258 |
| BREEZES | 60368 | 5 | 560368 |
| THAT | 191732 | 6 | 6191732 |
| ARE | 51731 | 5 | 551731 |
| BLOWING | 58622 | 5 | 558622 |

Figure 5

| PARSED MESSAGE | INDEX VALUE | LENGTH | CONCATENATED LENGTH TO INDEX VALUE |
|---|---|---|---|
| FOUR | 14856 | 5 | 514856 |
| SCORE | 173185 | 6 | 6173185 |
| AND | 48603 | 5 | 548603 |
| SEVEN | 176671 | 6 | 6176671 |
| YEARS | 217947 | 6 | 6217947 |
| AGO | 46174 | 5 | 546174 |

Figure 7

| KEY SECTIONS (KS) |
|:---:|
| 619 |
| 175 |
| 061 |
| 004 |
| 436 |
| 129 |
| ∘ ∘ ∘ |

Figure 8

| MESSAGE SECTIONS (MS) |
|:---:|
| 51 |
| 48 |
| 56 |
| 61 |
| 73 |
| 18 |
| ∘ ∘ ∘ |

Figure 9

| KEY SECTIONS (KS) | MESSAGE TEXT SECTIONS (MS) | CIPHER TEXT CS = (KS) CAT (MS) |
|---|---|---|
| 619 | 51 | 61951 |
| 175 | 48 | 17548 |
| 061 | 56 | 06156 |
| 004 | 61 | 00461 |
| 436 | 73 | 43673 |
| 129 | 18 | 12918 |

Figure 10

TEMPLATE FILE 116

| |
|---|
| 8:<00><01> WITH THE <03> OF <04> WHO <07><09> AT THE <08><04> |
| 7:<00><02> WHEN THE <01><04> WERE <09> THE <03> WITH <04> |
| 6: <06> S <05> <09> THE <01> <04> OF SUCH <05> |
| 5: THE <02> <04> ARE/IS BOTH <01> AND <02> WITH <05> |
| 4: <00> <01> AND <02> THIS <06> |
| 3: <00> <01> AND <02> |
| 2: <00> <02> |
| 1: <04> |

Figure 12

| | |
|---|---:|
| ms) Cat; message text converted to index, 2 digit "M sections" | 61 |
| ks) Key; converted to index, 3 digit "K sections" | 708 |
| | |
| Encrypt | |
| cs) Cat of ks and ms | 70861 |
| | |
| Context abstraction | silver |
| | |
| Decrypt | |
| ks) Key; converted to index, 3 digits | 708 |
| Process) find word at key position | 708 <+> silver |
| color position | 61 |
| m) | 61 |

Figure 14

METHOD FOR STEGANOGRAPHIC CRYPTOGRAPHY

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to cryptography and, more specifically, to using linguistic steganography in a cryptographic system.

2. Description

Cryptography is a discipline of mathematics concerned with information security and related issues, such as encryption, authentication, and access control. Early techniques for cryptography include Baudot codes and the Vernam cipher. A cryptographic system is typically used to transform clear text into cipher text and vice versa.

Steganography is the art and science of writing hidden messages in such a way that no one apart from the intended recipient knows of the existence of the message. This is in contrast to cryptography, where the existence of the message itself is not disguised, but the content is obscured. Linguistic steganography is the art of using written natural language to conceal secret messages. The idea is to hide the very existence of the message.

Several automated techniques exist to transform ciphertext into text that looks like natural language text while retaining the ability to recover the original ciphertext. This transformation changes the ciphertext so that it doesn't attract undue attention from, for example, hackers, agencies or organizations that might want to detect or censor encrypted communications. Although it may be relatively easy to generate a small sample of quality text, it is challenging to be able to generate large texts that are meaningful to a human reader and which appear innocuous.

One system for text steganography is called NICETEXT (available on the Internet at http:\www.nicetext.com\. (with "\" replacing "/") and described in the paper (publicly available at that web site) entitled "A Practical and Effective Approach to Large-Scale Automated Linguistic Steganography," by Mark Chapman, George Davida, and Marc Rennhard. The Chapman paper describes two methods. The first method is to use a set of grammatical rules to generate models for output text on-the-fly. The second method is to generate sentence models for output text by parsing known documents. The NICETEXT system largely ignores the grammar approach in favor of static sentence models that are automatically generated from sample text. According to the Chapman et al., paper, the static sentence model requires that the sentence structure be created from known bodies of text. From a security perspective, this is deficient. Hence, better techniques are desired.

BRIEF DESCRIPTION OF THE DRAWINGS

The features and advantages of the present invention will become apparent from the following detailed description of the present invention in which:

FIG. 5 is a sample portion of parsed key phrase words and associated index values with concatenated length values according to an embodiment of the present invention;

FIG. 7 is a sample portion of message words and associated index values with concatenated length values according to an embodiment of the present invention;

FIG. 8 is a sample portion of key sections converted into numeric values according to an embodiment of the present invention;

FIG. 9 is a sample portion of message sections converted into numeric values according to an embodiment of the present invention;

FIG. 10 is a sample portion of cipher text generated from key sections and message sections according to an embodiment of the present invention;

FIG. 12 is an example of a template file according to an embodiment of the present invention;

FIG. 14 is an example of encryption and decryption according to an embodiment of the present invention.

DETAILED DESCRIPTION

Embodiments of the present invention comprise methods for encrypting a message ("clear text") into hidden cipher text. Embodiments of the present invention may be used to encrypt clear text into a contextual altered form that does not appear to an observer to be cipher text. Embodiments of the present invention produce encrypted text without using a mathematical model of prime number factorization. Embodiments of the present invention provide better security by producing better quality cipher text output than known linguistic steganography prior art approaches.

In embodiments of the present invention, hidden cipher text may be generated as follows. A message text string to be encrypted may be broken up into individual words. Each word may be looked up in a very large list of words. In one embodiment, the word list comprises over 250,000 words. The value of the index (position) of each word of the message in the list may be recorded. The word index values may be concatenated together to form a message string. A key phrase may be broken up into individual words. Each word may be looked up in the word list and the value of the index of each word of the key phrase may be recorded. The key phrase index values may be concatenated together to form a key string. The message string and key string may be broken into many sections, and each pair of message and key sections may be concatenated together to form a cipher text section. Each cipher text section may be matched to a matrix of words that are arranged in a contextually meaningful manner. The matching comprises replacing the cipher text section numeric values with one or more words from the word matrix according to tags identified in a template file. The resultant output text is a string of apparently meaningful text that has no discernible relationship to the input message. By randomly selecting tags in the template file, every time the present method is applied to a message, the output text will be different.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Throughout this document the following terms may be used:

M refers to clear text.
K refers to the text of the key
C refers to cipher text
MS refers to sections of M
KS refers to sections of K
Cat, CAT, or car refer to concatenation.

Figure 1:
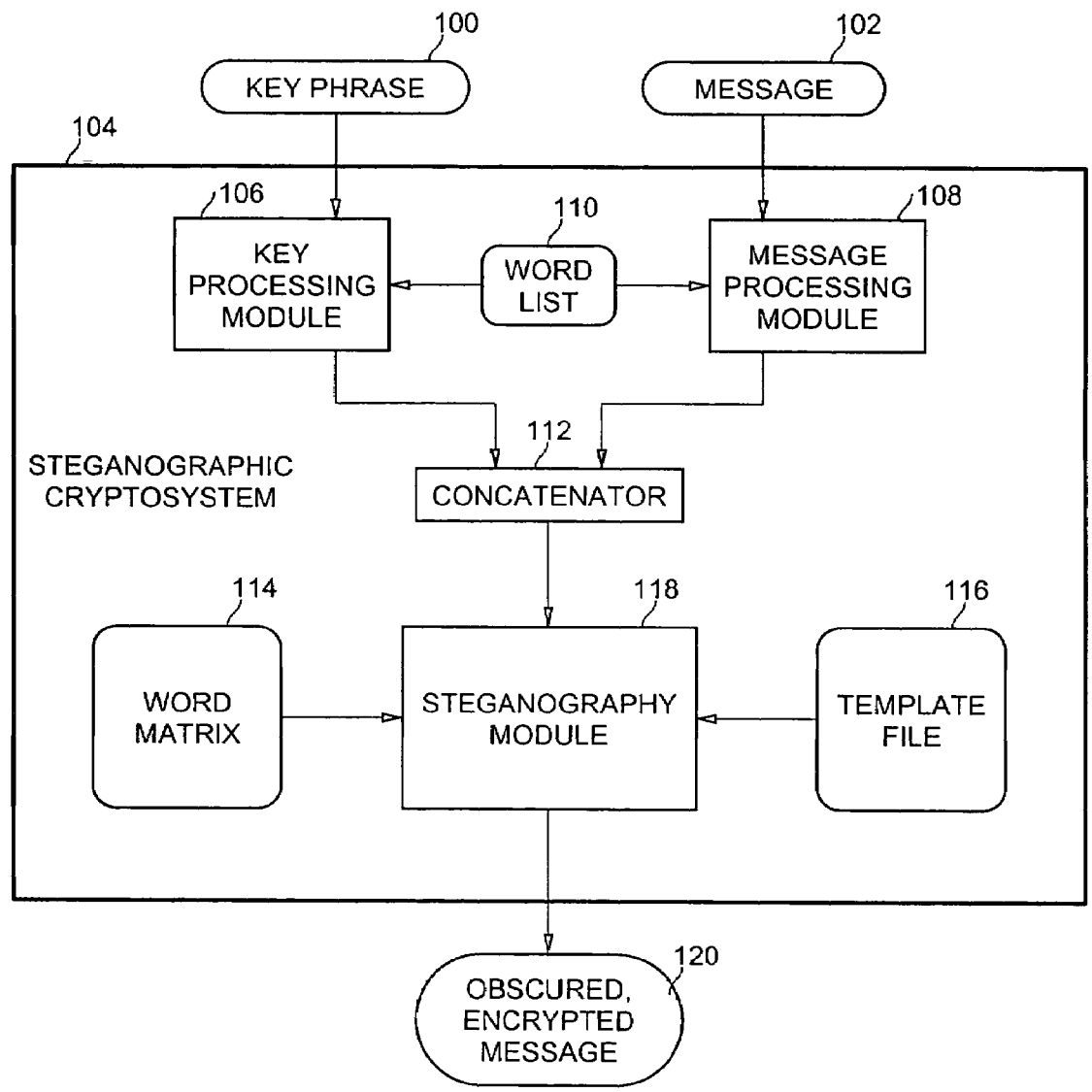
FIG. 1 is a diagram of a steganography system according to an embodiment of the present invention.

FIG. 1 is a diagram of a steganography system according to an embodiment of the present invention. A key phrase 100 and a clear text message 102 may be input to a steganographic system 104. The key phrase comprises one or more words, each word having one or more characters. The key phrase is chosen by a party using the system. The message comprises one or more words, each word having one or more characters.

In one example, the key phrase could be "the green mountain has breezes that are blowing" and the message could be:

"Four score and seven years ago our fathers brought forth on this continent, a new nation, conceived in Liberty, and dedicated to the proposition that all men are created equal. Now we are engaged in a great civil war, testing whether that nation or any nation so conceived and so dedicated, can long endure. We are met on a great battle-field of that war."

The key phrase may be input to key processing module 106 of the steganographic system. The key processing module converts the key phrase into a numeric string by looking up the words of the key phrase in word list 110. Word list 110 comprises a very large one dimensional list of words. In one embodiment, the word list may comprise over 250,000 words and may also include single alphabetic characters, punctuation, and special characters (e.g., *&^% $, etc.). The message may be input to message processing module 108 of the steganographic system. Message processing module 108 converts the message phrase into a numeric string by looking up the words of the message in word list 110. Concatenator 112 concatenates the key phrase string with the message string as described in further detail below, and forwards the combined string to steganography module 118. Steganography module 118 accesses word matrix 114 and template file 116 as described further below to transform the combined string into obscured, encrypted message 120. Although not shown in FIG. 1, the steganographic system according to embodiments of the present invention may also be used to convert obscured, encrypted message 120 back into clear text message 102.

Figure 2:
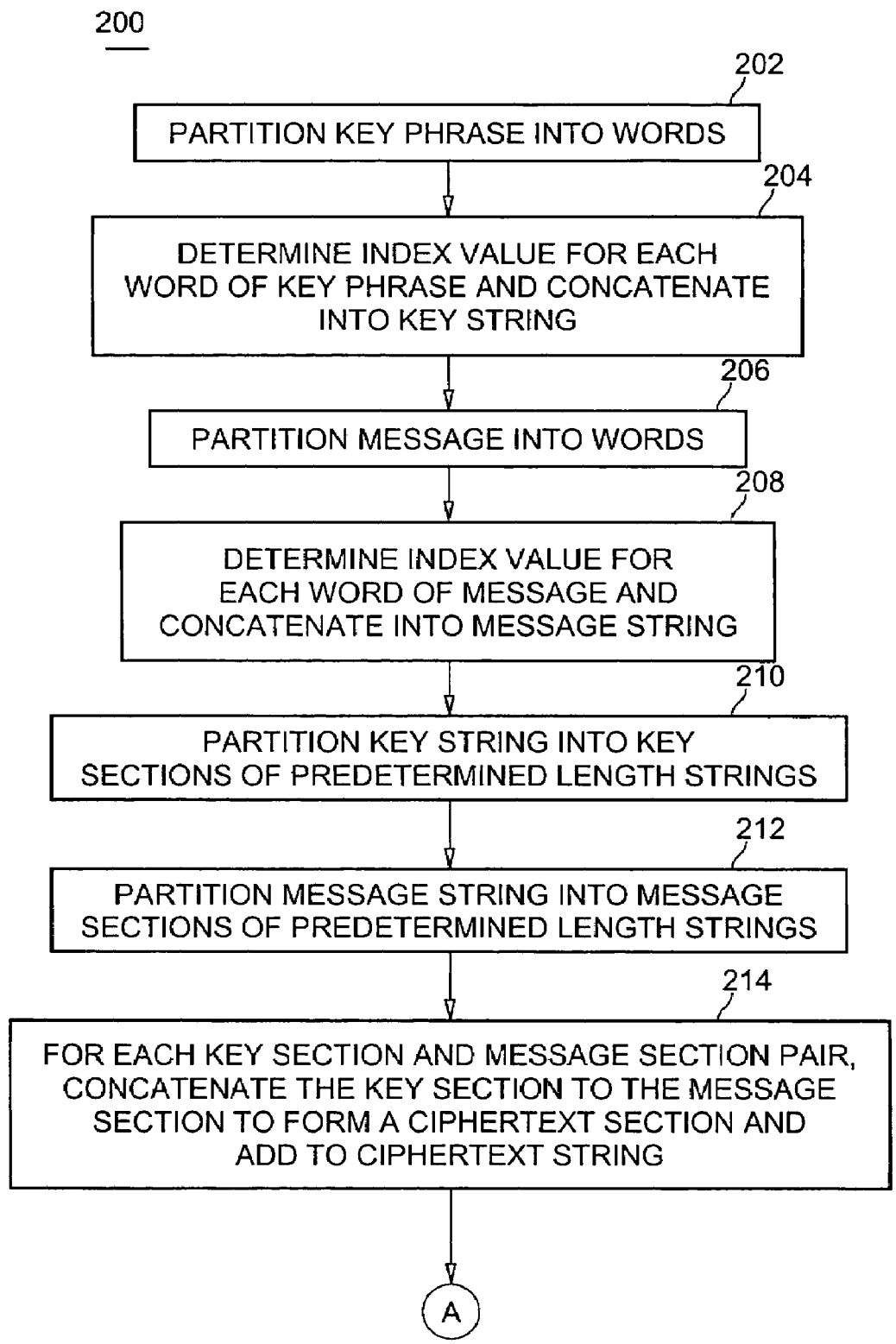
FIGS. 2 and 3 are flow diagrams illustrating steganography processing according to an embodiment of the present invention.
Figure 3:
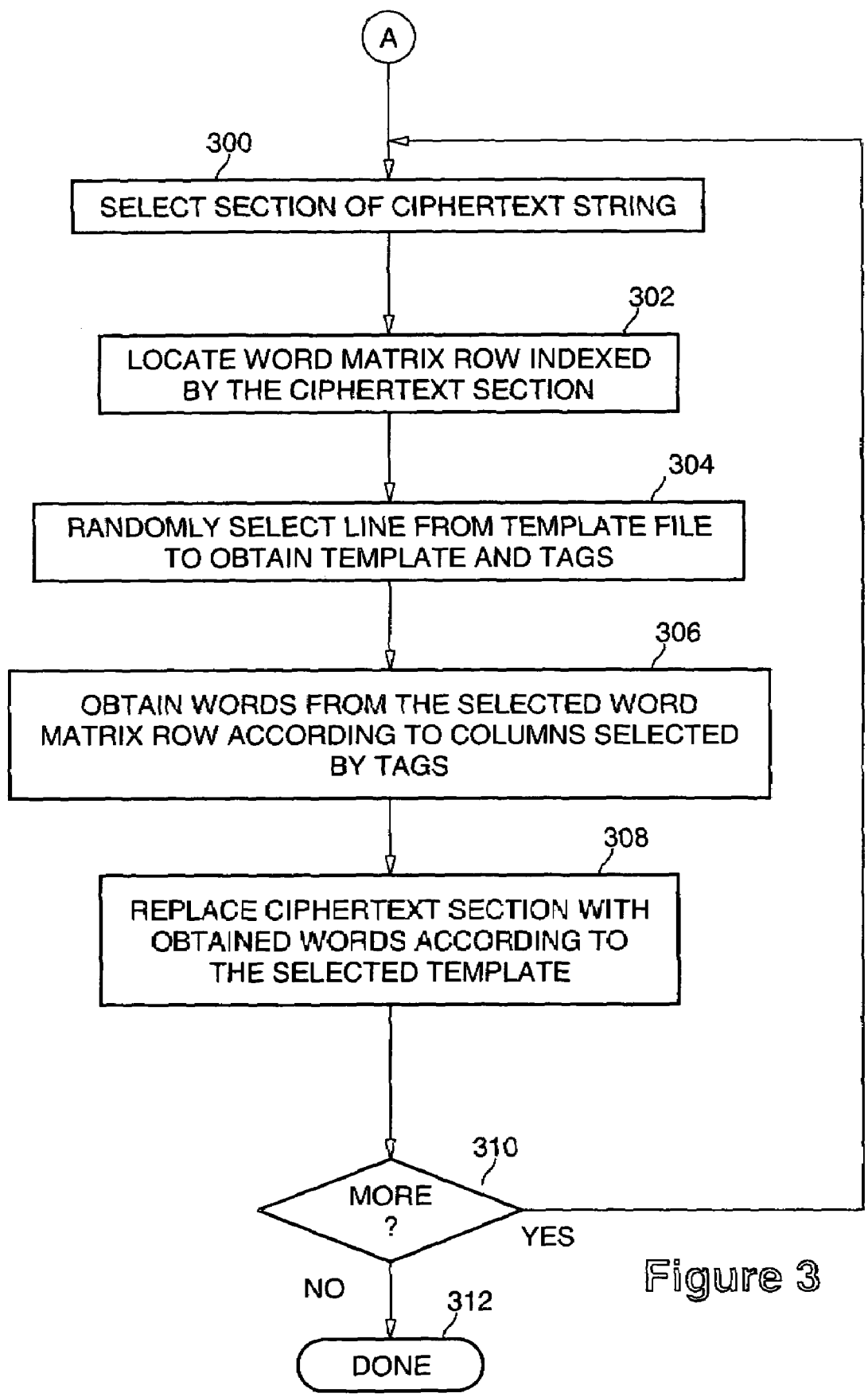
Figure 4:
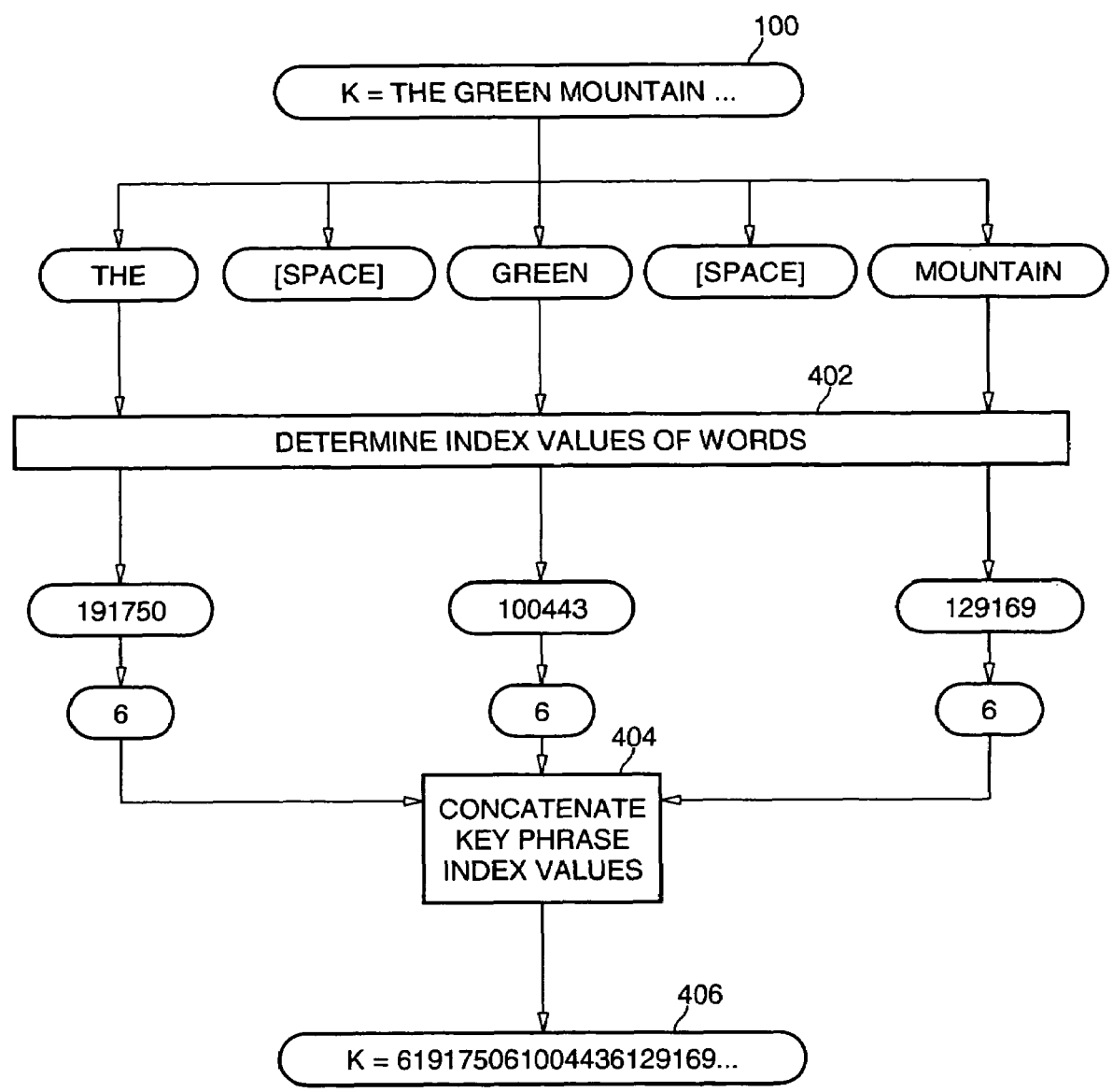
FIG. 4 is an example diagram for determining index values of words in a key phrase according to an embodiment of the present invention.

FIGS. 2 and 3 are flow diagrams illustrating steganography processing 200 according to an embodiment of the present invention. At block 202, the key phrase may be parsed and partitioned into separate words. In one embodiment, punctuation and spaces may be ignored. At block 204, an index value for each word may be determined by looking up each word in the word list. In one embodiment, the index value comprises the entry number or position (subsequently represented as a string of numeric characters rather than a number value) of the current word in the one dimensional word list. FIG. 4 is an example diagram for determining index values of words in a key phrase according to an embodiment of the present invention. The key phrase 100 may be partitioned into the separate words and punctuation as shown. For example, the index value for the word "the" of the key phrase may be determined at block 402, resulting in the numeric string "191750". Similarly, processing of the word "green" may result in an index value of numeric string "100443" and processing of the word "mountain" may result in the numeric string "129169", and so on. In one embodiment, a length value of each numeric string may be prepended to each numeric string. For example, since the numeric string "191750" has six digits, the character "6" may be prepended to the index value for the word "the" to result in the string "6191750." Similar processing may be performed in turn for each word of the key phrase. The resulting strings may be concatenated together at block 404 to produce key string 406 (e.g., "6191750610044361291 69 . . . " in this example). FIG. 5 is a sample portion of parsed key phrase words and associated index values with concatenated length values according to an embodiment of the present invention. In another embodiment, use of a fixed length index value would negate the requirement for an index value length field.

Because the key phrase would be known by a sender/encryptor and by a receiver/decryptor, in one embodiment the length value for each key phrase word may be omitted from the key string.

In one embodiment, if the word being looked up is not in the word list, the word may be broken into letters, and each letter may be found in the word list.

Figure 6:
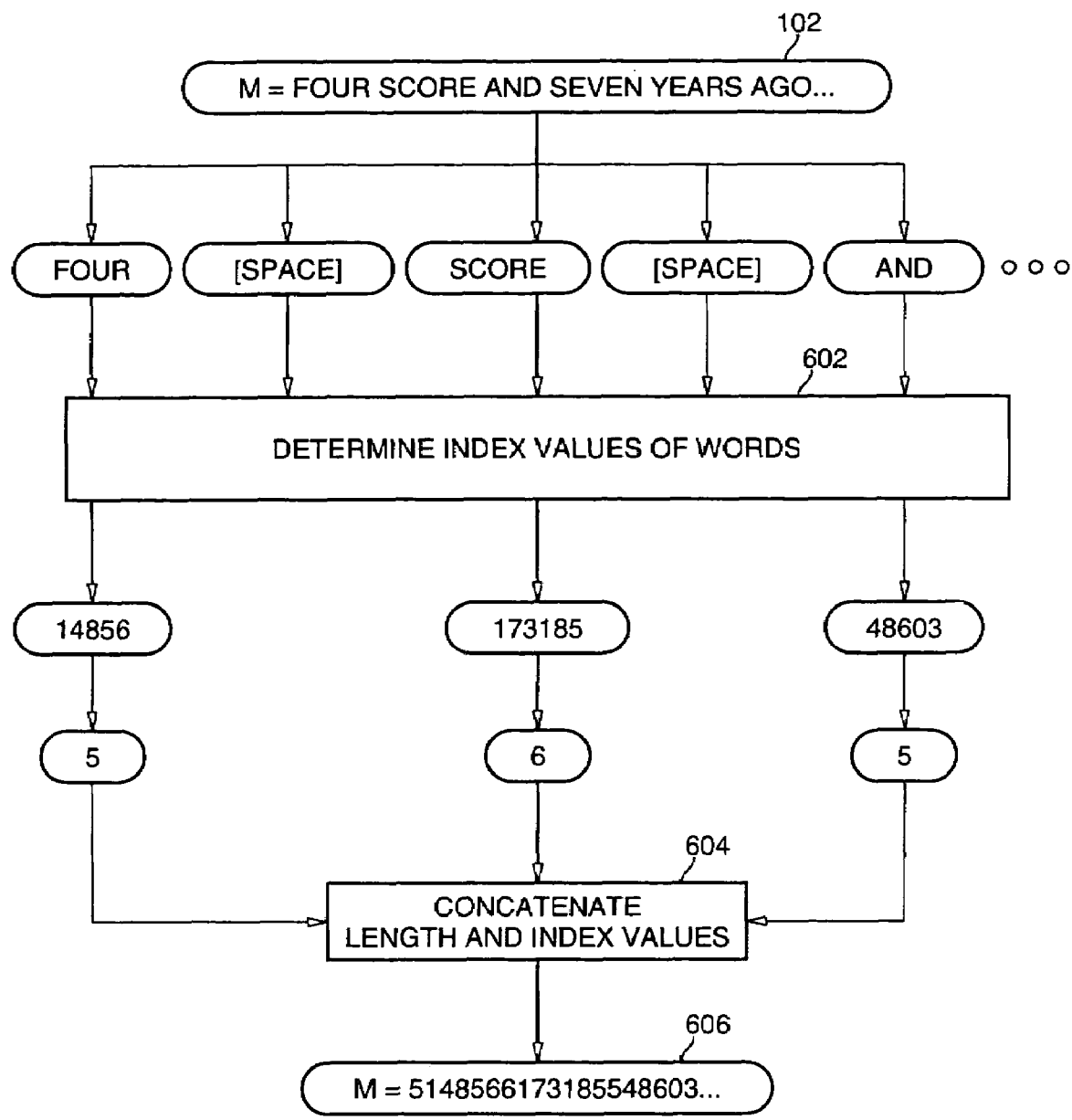
FIG. 6 is an example diagram for determining index values of words in a message according to an embodiment of the present invention.

Returning to FIG. 2, at block 206, the message may be parsed and partitioned into words. In one embodiment, punctuation and spaces may be ignored. At block 208, an index value for each word may be determined by looking up each word in the word list. In one embodiment, the index value comprises the entry number or position of the current word in the one dimensional word list. FIG. 6 is an example diagram for determining index values of words in a message according to an embodiment of the present invention. The message 102 may be partitioned into the separate words and punctuation as shown. For example, the index value for the word "four" of the key message may be determined at block 602, resulting in the numeric string "14856". Similarly, processing of the word "score" may result in an index value of numeric string "173185" and processing of the word "and" may result in the numeric string "48603", and so on. In one embodiment, a length value of each numeric string may be prepended to each numeric string. For example, since the numeric string "14856" has five digits, the character "5" may be prepended to the index value for the word "four" to result in the string "514856." Similar processing may be performed in turn for each word of the message. The resulting strings may be concatenated together at block 604 to produce message string 606 (e.g., "5148566173185548603 . . . " in this example). FIG. 7 is a sample portion of message words and associated index values with concatenated length values according to an embodiment of the present invention. In one embodiment, After processing blocks 202-208, in this example the key has been transformed into a key string:

K=6191750610044361291696103258560368619173255-1731558622;

and the message has been transformed into a message string:

5148566173185548603617667162179475461746142 2159-0014060200805181956088651482253059061922 8590020-0315142009140514209331075295509001414012009 1514-93570897519890900161209020518202593548603577 800-

6193242619175061594666191732547015612533932475743525884659002461395786214817324758731951989031076100395568072900082301189361914936216172619173261307716141496550625613077153518050897548603535180900200405040903012005049347304524978587233900246214817324761257855305903107610039590024020120201205780609051204530189619173262143939 0024

Returning to FIG. 2, at block 210 the key string may be partitioned by the steganography module into a plurality of sections of predetermined length strings. In one embodiment, the predetermined length is three characters for the key sections. Thus, the key string K=619175061004436129 . . . may be partitioned into strings of "619", "175", "061", "004", "436", "129", and so on. FIG. 8 is a sample portion of key sections converted into numeric values according to an embodiment of the present invention. At block 212, the message string may be partitioned by the steganography module into a plurality of sections of predetermined length strings. In one embodiment, the predetermined length is two characters for the message sections. Thus, the message string M=514856617318 . . . may be partitioned into strings of "51", "48", "56", "61", "73", "18", and so on. FIG. 9 is a sample portion of message sections converted into numeric values according to an embodiment of the present invention. In one implementation, by using three characters for the key section and two characters for the message section, the resulting string has five numeric characters, thereby allowing for an index into a 100,000 row array. In other implementations, other length strings may be used.

At block 214 of FIG. 2, for each key section and message section pair, the key section characters (KS) may be concatenated by the steganography module to the message section characters (MS) to form a cipher text section (CS) (e.g., CS=(KS) CAT (MS)). Each cipher text section is added to the end of a cipher text string. Since the key phrase may typically be shorter than the message, key sections may be reused with later message sections in a "wrap around" manner. FIG. 10 is a sample portion of cipher text generated from key sections and message sections according to an embodiment of the present invention. After processing of all key section and message section pairs (i.e., there are no message sections left to process), the message has now been transformed into a cipher text string. In this example, the cipher text string is:

619511754806156004614367312918169556104832560856360361786166917713256251717315945867561946175170614600414436221291516990610013254085660036128610091780325515178131595586606198817565014004824362512930169596100632519856220368586190917023250051731315515864261900175910614000451436421290916933610103257585629036558610991700325145171431501586206190917515061140049343657129081699761051325988569003690861019176132520517903152058651619821750206159004354364812960169356107732580856060361986132917423256151791315755860661915175940616600461436911297316925610473250185656036128615391739325325174731557586436195217558068184004654369012902169466101332595856780366286114917813257351724315755868761931175950611900489436031291016976610103250385695036568618091772325905170031582586306191117589061360041943614129931696261016325178562603619861179173232561517303157758616619141751406196004554360612925169616103032577856150363586118917053257051789315755864861960175350613500418436091290016920610043250585604036098610391701325205170531504586936194717530061450042443697129851698761023325398560003624861629171432581517733152458676619121755706185004534360512990169316100732561856000363986159917003252451702315015862061920175120610500478436061290916905610123250485653036018618991761325915177331526586216194317593061900040243644

Figure 11:
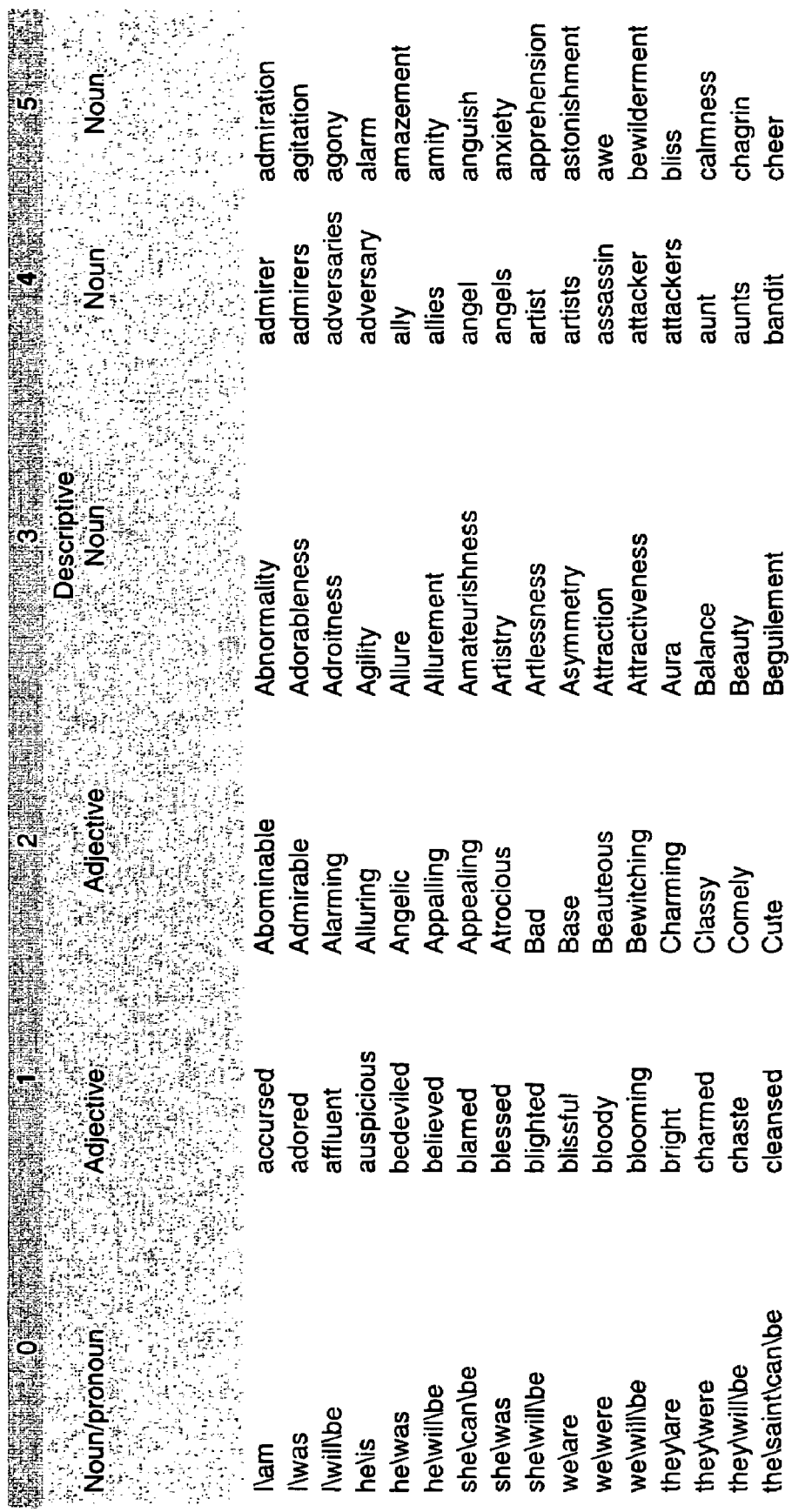
FIG. 11 is an example of a fragment of a word matrix according to an embodiment of the present invention.

At this point, the message is reasonably well encrypted using a variable length key. However, the cipher text string looks like encrypted data. Further processing by the steganography module will make identification of the cipher text less obvious. Turning now to FIG. 3, at block 300, a section of the cipher text string may be selected. In one embodiment, a cipher text section may be five characters long, in order to index an array of up to 100,000 rows. In other embodiments, other sizes of cipher text sections may be used. Initially, the first cipher text section may be chosen (such as CS="61951" in the example). At block 302, the row of the word matrix indexed by the number represented by the cipher text section string may be located. FIG. 11 is an example of a fragment of a word matrix according to an embodiment of the present invention. In one embodiment, the word matrix comprises a two dimensional array having 100,000 rows and 9 columns, although the size of the word matrix is implementation dependent. Each row includes a plurality of words. Each column of the word matrix stores a word of a predetermined part of speech, such as noun/pronoun, adjective, descriptive noun, verb, adverb, preposition, etc. Although only five columns of a specific sequence of word types are shown in the example word matrix fragment of FIG. 11, it should be understood that the inclusion and ordering of the word types in columns, and the number of columns, may be modified depending on the implementation without departing from the scope of the present invention.

In one embodiment, the 100,000 row word matrix may be constructed from 1,000 blocks of 100-row matrices, wherein the order of the rows of each block as the word matrix is generated are randomly scrambled from the order of the rows in the previous block. That is, in different blocks of the word matrix, rows have the same words but the position of the rows within each block are different as compared to another block (i.e., the rows are in a randomly different order for each block). This helps to deter decrypting the output text by an attacker because there is not a 1:1 correspondence between any cipher text section value (overall word matrix row number) and output word.

At block 304, a line from a template file may be randomly selected to obtain a template and tags. FIG. 12 is an example of a template file according to an embodiment of the present invention. In this example, the template file includes eight templates, although in other implementations, any number of templates may be used. Each template includes a plurality of tags. A tag identifies a column number in the word matrix. For example, the tag <00> identifies the 0'th column of the word matrix, and the tag <01> identifies the first column of the word matrix (where columns are indexed from zero to eight in this example). Each template specifies a sentence structure model to be followed when constructing a section of output text based on a plurality of cipher text sections. In different embodiments, different sentence structures may be used, or may even be repeated in the template file. Templates may be constructed to model sentence structures from different types of documents containing a large volume and variety of text, such as poetry, weather reports, financial documents, invoices, bill of materials, inventory lists, contracts, novels, sports narratives, etc.

At block 306, one or more words from the row of the word matrix selected by the cipher text section that are stored in a column of the word matrix selected by a tag may be obtained.

At block 308, the cipher text section may be replaced by the obtained words according to the sentence structure model of the randomly selected template to produce a section of output text. If more cipher text sections are to be processed at block 310, processing of the next cipher text section in the cipher text string continues at block 300. Otherwise processing is done at block 312. In one embodiment, when a tag includes more than one column designation (such as in example template line three, for example), additional cipher text sections are processed to select the word matrix row for each additional tag.

Figure 13:
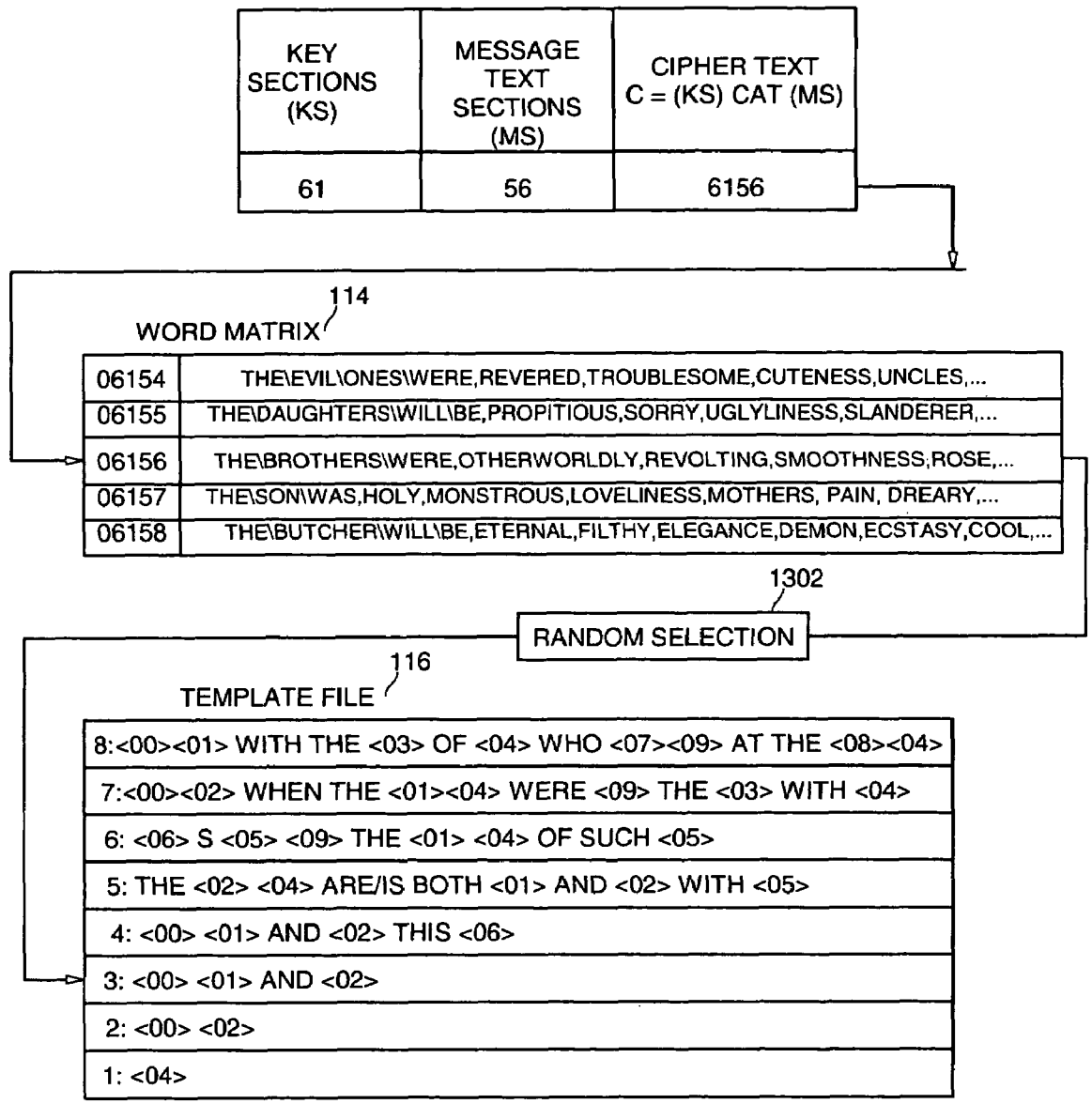
FIG. 13 is an example of processing a cipher text section using the word matrix and the template file according to an embodiment of the present invention.

FIG. 13 is an example of processing a cipher text section using the word matrix and the template file according to an embodiment of the present invention. As shown in this example, a cipher text section of "61951" may select the 61951'st row of word matrix 114 (only a few rows of the word matrix are shown for clarity). This row of the word matrix may include a plurality of words as shown. A template line may be randomly selected from template file 116 at block 1302. In this example, assume template line number 3 was randomly selected. This template includes tags <00>, <01>, the word "and", and the tag <02>. Thus, the words "The brothers were" were used from column zero of the word matrix. The next cipher text section may be processed to determine the replacement word for tag <01>, and a subsequent cipher text section may be processed to determine the replacement word for tag <02>.

In this manner, output text representing obscured, encrypted message 120 may be built word by word from the steganographic system.

Decryption may be performed in the reverse manner to transform the obscured, encrypted message back into the clear text message. FIG. 14 is an example of encryption and decryption according to an embodiment of the present invention. A key section "708" may be concatenated to message section "61" to form cipher text section "70861". The value may index the word matrix to select the word "silver" according to a randomly selected tag. During decryption, the receiver knows the key phrase and current key section, so the receiver finds the word "silver" in the word matrix in order to reconstruct the message section. When presented with the task of decrypting, the person who is decrypting will know the key. When the key is parsed in the same manner as previously mentioned, the present system produces key sections. Keeping in mind that the steganographically obfuscated cipher text is simply a string of words, one can know that the system will look at the each word of the cipher text and use the key value as a pointer to the correct section of the word matrix. As mentioned previously, each section is comprised of 100 rows of multiple words. Words do not repeat themselves within each 100 row section. Therefore, when, for example, the word "silver" shows up, the key informs the decryptor that this word is at index value 708XX of the word matrix. So one knows that the word "silver", although it shows up multiple additional times with the word matrix, is within one of the 100 rows that make up the 708XX (70800 through 70899) block of the word matrix. Within this block, "silver" only shows up once at row 61 of the 708XX block. Therefore, it may be determined that the decrypted value is 70861.

Pseudo-code for one example implementation of an embodiment of the present invention is shown in Table I. In this example, the message text is the first three sentences of Lincoln's Gettysburg Address.

TABLE I

```
© 2006 Intel Corporation
Pseudo-code Development framework for Steganographic Context
Encryption
####################################################################
###########
# Parse the key (K)
####################################################################
###########
$k = "The green mountain has breezes that are blowing";
####################################################################
###########
# Parse clear text (M)
####################################################################
###########
$m = "Four score and seven years ago our fathers brought forth on this
continent, a new nation, conceived in Liberty, and dedicated to the
proposition that all men are created equal. Now we are engaged in a great
civil war, testing whether that nation or any nation so conceived and so
dedicated, can long endure. We are met on a great battle-field of that
war.";
####################################################################
###########
# Load the word lists
####################################################################
###########
open (WORDS, "pos_words.txt");
open (CHARS, "characters.txt");
####################################################################
###########
# Process the Key (K)
####################################################################
###########
foreach (@k)
{
Process function ( )
}
print "Key is $key\n";
Cut the key up into chunks of 3 digits called "K sections"
foreach (@ks)
{
print "key sections in ks $_\n";
}
print "Key processing complete $ksection_count \n\n\n";
####################################################################
###########
# M) Calculate word index or render a word value
# Use the long word list to find matches
####################################################################
###########
foreach (@m) ## Is like saying for each word in M
{
    ### Word position values are created in the following code
    ## Find this word in the word list
    foreach (@words)
    {
        ## Description: Count the digits in the index reference (ex.
78238 = 5)
    print "Match: $m $w Position is $c, Descr is $d\n";
    }
    ## If the word is not in the word list then it needs to be rendered
        ## What is the index value of the single character
        ## Build the description
            ## Build the description descriptor
            ## The full descriptor is 5 digits:
            ##      Always begins with 9 followed by four digits to
            ##describe length
            ##      The four digits will be layed out with leading zeros
            ## Example, 116105105118104125
            ##          is 18 digits long
            ##          90018 + 116105105118104125
            ##          = 90018116105105118104125
    ### Punctuation final processing
    ## If a punction mark was found push it into the running array
    ##now.
    ### Assemble M into M Sections
    ### Cut M into chunks of 2 digits called "M sections"
    ## Grab the last set of digits that didn't up in the M sections
####################################################################
###########
```

TABLE I-continued

```
# Level 1 Encryption
# Produces a numeric string that is encrypted.
# Similar to ce_jupiter but concatenates key to M rather than
#  adding key to M (w/ a length byte)
####################################################################
##########
print "C) Encryption level 1\n$c1_string\n";
####################################################################
##########
# Level 2 Encryption: Create a full template array

####################################################################
##########
open (MATRIX, "word_matrix_final.txt");
open (TEMPLATE, "template_poetry3.txt");
        ### Create the full template first.
        ##  Then replace the tags with the matrixed words.
        ### Step 1: Build the full template
        print "ca_count: $ca_count\n";
        #This is how many 5 digit C Sections are in the C array
        ### Build up the template until there are enough elements
        ## Use the top five rows of the template, the other lines are too short.
        ### Now grab the line from the template that random suggested
        ## If the full template has enough elements then bounce out of this
        ##loop
        ## If the difference between the ca_count_match and ca_count is
        ##less than X than grab a smaller
        ##   template line to finish the full template off
Display the template
####################################################################
##########
# Level 2 Encryption: Matching C sections to template to matrix

####################################################################
##########
At this point we have an array (@full) that contains the pre-built
template.
We need to replace the tags (<04>) with words from the matrix
    ##from @ca
    ### Now we have a single tag and the line and the value from the
    ##matrix
    ### Go fetch the word from the matrix
    ### Now we have the proper record from the matrix
    ### Parse the matrix record
Final step, build the final text presentation
@matrix_words has all of the words that are needed
@full has the template with tags in it.
        ## Work with one line of the template at a time
        ## go through the parts of this one line
Display the steganographically morphed cipher text
foreach (@new_array)
{
    print "New array: $_\n";
}
```

Table II shows the resulting obfuscated cipher text for the example of the first three sentences of the Gettysburg Address.

TABLE II

The brother will be pesky
The brothers were wonderful when the content meat were spent the attraction with fiends
The gardener can be blamed with the pizzazz of partner who cankeredly elected at the truer saboteur
I am ill-fated and shapely
The mothers are hateful and unpleasant
The mother will be lucky and shapely
The wife will be pleasing when the propitious flower were processed
The pleasantness with mother
Tulip
They will be radiant when the horrifying enemy were absorbed the suppleness with church
Dreary December's pain headed the propitious meat of such bliss
Dreary January's unease found the cleansed dogs of such calmness
The unpleasant mothers are/is both pious and handsome with astonishment

TABLE II-continued

Friends
We were alluring when the lucky admirers were financed the pleasantness with rats
Mid-November's awe appraised the providential murderer of such alarm
The mean artist are/is both excommunicated and troublesome with intimidation
The scandalous attackers are/is both happy and servile with peace
The evil one is fine when the prosperous opposition were the winsomeness with partner
The brothers will be dirty
Misty August's astonishment configured the just poets of such pacification
The sister was pious and nice
The sisters are despicable
The murderer will be mean
The mothers will be wonderful
The son is infamous with the artlessness of roses who eloquently contradicted at the shorter flower
The lover was horrific
The husband is execrable and dazzling this Friday
The frightful spy are/is both humble and horrendous with misery
The wife will be glad and marvelous this mid-March
The gardener will be godly and refined
The hater is god-fearing and repulsive
The mistress is horrifying and horrendous
The enticing attackers are/is both good and ugly with nervousness
The husband will be godlike and horrible
Inquisitor
The unpleasant opposition are/is both religious and wonderful with peacefulness
Attackers
Mid-January's dejection found the immaculate traducer of such equanimity
Uncles
The good ones were healthy and statuesque this dreary summer
He was adored with the tact of buddy who oddly entered at the lonelier saboteur
The brother is blissful and appalling
The husband will be bewitching when the reverent companion were analyzed the tactlessness with congregation
The gardener will be faultless with the coarseness of revolutionary
Who eloquently recommended at the freer people
Misty winter's peace configured the healthy bandit of such grief
The sister is immortal and pulchritudinous
The sister will be horrifying and fascinating
The ignoble congregation are/is both reverent and sickening with amity
I will be bright and distressing this mid-September
The foxy spy are/is both condemned and gorgeous with congeniality
The sisters are bedeviled and sublime this yucky March
The priest can be repugnant
The brother is bad when the hopeful fiend were furthered the adroitness with gardens
The sons will be condemned and exquisite
The father was favorable and troublesome this dreary fall
Churchs
We were excommunicated with the ungainliness of flower who tirelessly analyzed at the longer traitor
The wife will be redeemed and horrid this Thursday
The saint can be perfect with the oafishness of traitor who ballistically adjusted at the colder gardens
The evil one was consecrated and filthy Embodiments of the present invention improve upon prior art techniques such as NICETEXT because the present invention uses a word matrix and a template file instead of grammatical rules. This difference allows embodiments of the present invention to produce obfuscated cipher text in a variety of different formats that do not necessarily depend on the grammatical structure of the message text. Thus, the generated obfuscated cipher text is of better quality.

Given the same clear text message and key phrase, embodiments of the present invention will produce a different obscured, encrypted message with each run. This makes it very difficult for brute force methods of attack to be successful.

In another embodiment, a matrix of numbers instead of words may be used. The result would be an implementation similar to a "one time cryptographic pad." This system would produce cipher text that could not be cracked effectively due to a lack of certainty of a solution.

Although the operations described herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action and produce a result.

What is claimed is:

1. A method of encrypting a clear text message into an obscured, encrypted message using a key phrase comprising:
    partitioning the key phrase and the clear text message into separate words;
    determining an index value for each word of the key phrase, concatenating the index values together to form a key string, and partitioning the key string into sections of a first predetermined length;
    determining an index value for each word of the clear text message, concatenating the index values together to form a message string, and partitioning the message string into sections of a second predetermined length;
    for each key section and message section pair, concatenating the key section to the message section to form a cipher text section, and adding the cipher text section to a cipher text string; and
    for each section of the cipher text string, locating a row of a word matrix indexed by the cipher text section, randomly selecting a template from a template file, the template including a plurality of tags, obtaining one or more words from the word matrix row according to columns selected by the tags, and replacing the cipher text section with the obtained words according to the randomly selected template to form the obscured, encrypted message.

2. The method of claim 1, wherein determining the index value for at least one of a key phrase word and a clear text message word comprises determining a position of the word in a one dimensional word list.

3. The method of claim 1, further comprising prepending a length of each index value to each index value during concatenation.

4. The method of claim 1, wherein the word matrix comprises a two dimensional array of words, each row storing a plurality of words, with each column of the word matrix storing words of a predetermined type.

5. The method of claim 4, wherein the word matrix comprises a plurality of blocks, each block having a predetermined number of rows, and at least some blocks of the word matrix have rows that store the same words as rows in other blocks but the position of the rows within each block are randomly different as compared to other blocks.

6. The method of claim 1, wherein each template of the template file comprises a sentence structure model.

7. The method of claim 1, wherein the first predetermined length is three characters, and the second predetermined length is two characters.

8. The method of claim 1, further comprising reusing key sections during concatenation of key sections to message sections when the size the message is greater than the size of the key phrase.

9. The method of claim 1, wherein the length of a cipher text section is five characters, to index a word matrix having 100,000 rows.

10. An article comprising: a machine accessible medium containing instructions, which when executed, result in encrypting a clear text message into an obscured, encrypted message using a key phrase by
    partitioning the key phrase and the clear text message into separate words;
    determining an index value for each word of the key phrase, concatenating the index values together to form a key string, and partitioning the key string into sections of a first predetermined length;
    determining an index value for each word of the clear text message, concatenating the index values together to form a message string, and partitioning the message string into sections of a second predetermined length;

for each key section and message section pair, concatenating the key section to the message section to form a cipher text section, and adding the cipher text section to a cipher text string; and for each section of the cipher text string, locating a row of a word matrix indexed by the cipher text section, randomly selecting a template from a template file, the template including a plurality of tags, obtaining one or more words from the word matrix row according to columns selected by the tags, and replacing the cipher text section with the obtained words according to the randomly selected template to form the obscured, encrypted message.

11. The article of claim 10, wherein instructions to determine the index value for at least one of a key phrase word and a clear text message word comprise instructions to determine a position of the word in a one dimensional word list.

12. The article of claim 10, further comprising instructions to prepend a length of each index value to each index value during concatenation.

13. The article of claim 10, wherein the word matrix comprises a two dimensional array of words, each row storing a plurality of words, with each column of the word matrix storing words of a predetermined type.

14. The article of claim 13, wherein the word matrix comprises a plurality of blocks, each block having a predetermined number of rows, and at least some blocks of the word matrix have rows that store the same words as rows in other blocks but the position of the rows within each block are randomly different as compared to other blocks.

15. The article of claim 10, wherein each template of the template file comprises a sentence structure model.

16. The article of claim 10, wherein the first predetermined length is three characters, and the second predetermined length is two characters.

17. The article of claim 10, further comprising instructions to reuse key sections during concatenation of key sections to message sections when the size the message is greater than the size of the key phrase.

18. The article of claim 10, wherein the length of a cipher text section is five characters, to index a word matrix having 100,000 rows.

19. A steganographic cryptography system to encrypt a clear text message into an obscured, encrypted message using a key phrase comprising:
a key processing module to partition the key phrase into separate words, and to determine an index value for each word of the key phrase;
a message processing module to partition the clear text message into separate words, and to determine an index value for each word of the clear text message;
a concatenator, coupled to the key processing module and the message processing module, to concatenate the index values of the key phrase words to form a key string, and to concatenate the index values of the clear text message words to form a message string; and
a steganography module coupled to the concatenator, a word matrix, and a template file, to partition the key string into sections of a first predetermined length, to partition the message string into sections of a second predetermined length, for each key section and message section pair to concatenate the key section to the message section to form a cipher text section, and to add the cipher text section to a cipher text string, and for each section of the cipher text string to locate a row of the word matrix indexed by the cipher text section, to randomly select a template from the template file, the template including a plurality of tags, to obtain one or more words from the word matrix row according to columns selected by the tags, and to replace the cipher text section with the obtained words according to the randomly selected template to form the obscured, encrypted message.

20. The system of claim 19, wherein the key processing module determines the index value for at least one word of the key phrase by determining a position of the word in a one dimensional word list.

21. The system of claim 19, wherein the message processing module determines the index value for at least one word of the clear text message by determining a position of the word in a one dimensional word list.

22. The system of claim 19, wherein the concatenator prepends a length of each index value to each index value during concatenation.

23. The system of claim 19, wherein the word matrix comprises a two dimensional array of words, each row storing a plurality of words, with each column of the word matrix storing words of a predetermined type.

24. The system of claim 23, wherein the word matrix comprises a plurality of blocks, each block having a predetermined number of rows, and at least some blocks of the word matrix have rows that store the same words as rows in other blocks but the position of the rows within each block are randomly different as compared to other blocks.

25. The system of claim 19, wherein each template of the template file comprises a sentence structure model.

26. The system of claim 19, wherein the first predetermined length is three characters, and the second predetermined length is two characters.

27. The system of claim 19, wherein the steganorgraphy module reuses key sections during concatenation of key sections to message sections when the size the message is greater than the size of the key phrase.

28. The system of claim 19, wherein the length of a cipher text section is five characters, to index a word matrix having 100,000 rows.

* * * * *